(No Model.)
E. A. LANGFORD.
ORE FEEDER.
No. 485,501. Patented Nov. 1, 1892.
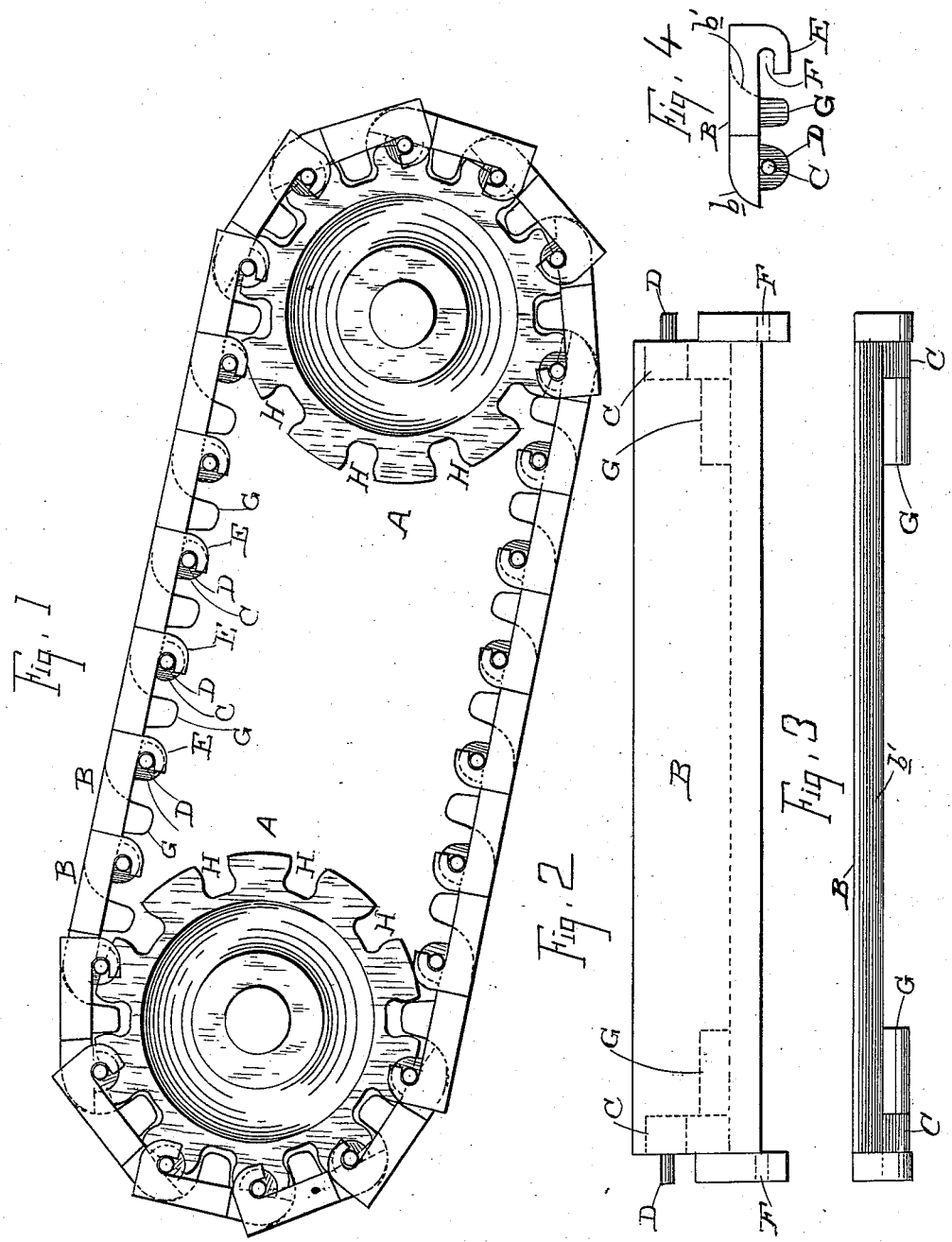
Witnesses
J. H. Rouse
J. A. Bayless
Inventor,
Ernest A. Langford
By Dewey & Co
attys.

United States Patent Office.

ERNEST A. LANGFORD, OF GRASS VALLEY, CALIFORNIA.

ORE-FEEDER.

SPECIFICATION forming part of Letters Patent No. 485,501, dated November 1, 1892.

Application filed May 11, 1892. Serial No. 432,627. (No model.)

*To all whom it may concern:*

Be it known that I, ERNEST A. LANGFORD, a citizen of the United States, residing at Grass Valley, Nevada county, State of California, have invented an Improvement in Ore-Feeders; and I hereby declare the following to be a full, clear, and exact description of the same.

My invention relates to improvements in ore-feeding devices, and is especially applicable to that class of feeders in which the ore is delivered to the crushing apparatus by a traveling belt.

It consists in the novel construction of a self-supporting belt the sections of which are so joined as to present no openings through them when bent for the purpose of passing around the carrying-pulleys and in certain details of construction which will be more fully explained by reference to the accompanying drawings, in which—

Figure 1 is a side elevation showing my feeding-belt and the pulleys or rollers around which it passes. Fig. 2 is a top view of one of the sections of the belt. Fig. 3 is an edge view. Fig. 4 is an end view.

A A are the pulleys around which my feeding-belt passes. These pulleys are suitably journaled with relation to a hopper or chute through which the ore passes and from which it falls upon the belt. A suitable means is provided for moving the belt slowly either continuously or by intermittent movements, these parts not being here shown because they are not a part of my present invention and are well known in connection with ore-feeders. I prefer to use two pairs of pulleys A, which are situated at the sides of the belt. The belt may be of any desired width or length and is made of sections B, having a length equal to the width of the belt. These sections are made, preferably, of iron, and each section has one edge formed with a convex curve of the segment of a cylinder in the central portion, as shown at *b*. The opposite edge is formed with a corresponding concave curve *b'*, so that when the sections are placed together the concavity at one edge overlaps the corresponding convexity of the other. The ends of the sections are made rectangular for a purpose to be hereinafter described.

C C are lugs through which are made the holes for the insertion of the pins D, by which the lengths are joined together; but I prefer to cast the sections with the pins upon them. At the opposite end and corresponding with the lug C is the bent lug E, having an open channel F, made on the inner side, so that the lug is practically in the form of a hook. The projecting ends of the pins D of each section engage with the hook-lug E of the next adjacent section, so as to unite them together in the form of an endless belt.

The upper surfaces of the sections B have rectangular corners at the ends, so that when the belts are in a straight line the ends abut against each other, and the connecting-pins below the bottom of the belt-sections serve as fulcrums, so that where the belt extends from one pulley to the other, the upper angles abutting together and the pins serving as a fulcrum against which any pull will act, the belt is prevented from sagging as it passes between the pulleys and is thus kept in a perfectly-straight line. It will in this condition carry any amount of load that may be placed upon it, and there will be no necessity for supports or guides beneath it. The curvature of the convex ends *b* and concave ends *b'* is formed about the centers of the uniting-pins D, so that when the sections reach the pulleys they turn about these pins. This causes the abutting outer ends to separate; but the body of the section upon which the ore lies, being formed with the curves *b* and *b'*, will simply roll around the pivots, so that these joints remain perfectly tight while passing around the pulleys, and no ore can fall through; nor can they in any way become clogged, so as to prevent the belt from assuming a straight position when it reaches the straight part of its travel.

Beneath the sections B are formed the projecting lugs G. The rims of the pulleys A have corresponding depressions H made in them, so that these lugs will enter the depressions, and the belt will thus be caused to travel around the pulleys. By this construction I provide a practically indestructible belt, simple in its construction, capable of sustaining itself and its load in a straight line without other support between the pulleys about which it travels.

Having thus described my invention, what

I claim as new, and desire to secure by Letters Patent, is—

1. A carrying-belt consisting of metallic sections having the opposite edges of the central portion respectively concave and convex and the ends rectangular and lugs and pins beneath the sections about which the end curves turn in passing around the supporting-pulleys, substantially as herein described.

2. An ore-feeder consisting of pulleys journaled upon the feeder-frame, having grooves made in their periphery, a belt formed of metallic sections the ends of which are rectangular in cross-section and the central portion having convex and concave edges which overlap and fit together, lugs formed on the lower surfaces of the sections, and pins by which said lugs are connected to form a complete endless belt and about which as centers the overlapping concave and convex edges of the belt-sections move when the belt passes around the pulleys, substantially as herein described.

In witness whereof I have hereunto set my hand.

ERNEST A. LANGFORD.

Witnesses:
S. H. NOURSE,
J. A. BAYLESS.